United States Patent
Whiting et al.

(10) Patent No.: US 6,456,626 B1
(45) Date of Patent: Sep. 24, 2002

(54) METHOD OF VIRTUAL CIRCUIT RECONNECTION WITHOUT LOSS OF CALL SESSION

(75) Inventors: David Whiting, Nepean; Greg Wilbur; Nevein Sultan, both of Ottawa; Richard K. Mayer, Nepean, all of (CA)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/216,992

(22) Filed: Dec. 21, 1998

(51) Int. Cl.[7] .................................................. H04J 1/16
(52) U.S. Cl. ...................................... 370/409; 370/410
(58) Field of Search ................................. 370/317, 325, 370/410, 409; 710/56

(56) References Cited

U.S. PATENT DOCUMENTS

| | | | |
|---|---|---|---|
| 4,884,263 A | * | 11/1989 | Suzuki |
| 5,530,905 A | * | 6/1996 | Nichols et al. |
| 6,031,817 A | * | 2/2000 | Moy |
| 2001/0000700 A1 | * | 5/2001 | Estambolchi et al. |

* cited by examiner

Primary Examiner—Salvatore Cangialosi
(74) Attorney, Agent, or Firm—Gibbons, Del Deo, Dolan, Griffinger & Vecchione

(57) ABSTRACT

In a data communications network in which virtual circuits and encapsulated virtual circuits may be established to carry calls from source terminals to destination terminals through network interfaces, information describing each virtual circuit is returned to, and stored at, the source. Should a virtual circuit or an encapsulated virtual circuit be interrupted, the destination holds the call open while the source requests reestablishment of the virtual circuit or encapsulated virtual circuit, by providing the stored description thereof through an alternate network interface. Upon reestablishment of the virtual circuit or encapsulated virtual circuit, the call proceeds with, or without, loss of data.

29 Claims, 9 Drawing Sheets the art and relevant to the present invention, in which terminal 162 at the REMOTE location requests communication with terminal 112 at the LOCAL location. Message flow is the reverse of that shown in FIG. 3, but likewise results in a call being is session between the two terminals.

METHOD OF VIRTUAL CIRCUIT RECONNECTION WITHOUT LOSS OF CALL SESSION

FIELD OF THE INVENTION

This invention pertains to connections on communication networks, and, more particularly, to the transparent reconnection of interrupted connections on communication networks.

BACKGROUND OF THE INVENTION

Communication systems usable for voice and data are known in the art, including POTS ("plain old telephone service") systems which make hard point-to-point connection. In recent years, network-based systems with dynamic routing capabilities have been introduced, in which data is divided into "packers" or "frames". Each packet or frame of data contain an indication of its destination, wherein the network forwards each frame or packet according to its embedded destination.

A high-level view of a typical network is shown in FIG. 1. A network 10 interconnects a plurality of network interfaces 20 which may be at different geographical locations. A plurality of customer premises equipment (CPE) 30 are connected, and located proximate to each network interface 20. CPE 30 may include such end-user devices as data terminals or voice telephone handsets. A CPE 30 at a particular location (the "source") may initiate communication with a CPE 30 at another location (the "destination") through the source network interface 20, the network 10, and the destination network interface 20.

In computer-based switching networks employing frame relay, packet switching, and the like, the communication links are not based on POTS-style hard connections. In such networks, the communication links are often referred to as "virtual circuits".

FIG. 2 depicts a portion of a communication network environment that will be taken as exemplary in discussing the present invention. Only two of a possible plurality of subscriber locations or sites are shown. Designated as LOCAL and REMOTE, the subscriber locations or sites may be interconnected by network 10. Each subscriber site, LOCAL and REMOTE, has a network interface (140 and 180 respectively) associated therewith. The LOCAL and REMOTE sites each have at lean one CPE 130 and 170 respectively. The LOCAL and REMOTE sites also each have at least one type of end-user equipment, such as data terminals 110, 112 etc, and data terminals 160, 162 etc. Those skilled in the art appreciate that CPEs 130 and 170 typically include computer chips or similar intelligence for interfacing end-user equipment to network interfaces 140 and 180 and the methodology for such interfacing is known in the art.

An embodiment of the present invention has been implemented in a system that functions according to ITU Q.933 protocol or other conventional signalling protocol specification, such as Q.2931. FIG. 3 depicts a scenario known to those skilled in the art in which it is assumed, by way of example, that terminal 112 at the LOCAL site requests to communicate with terminal 162 at the REMOTE site. CPE 130 receives the request (including address information for terminal 162) from terminal 112, and issues a Q.933 (or other conventional signalling specification SETUP message to network interface 140. By means known to those in the art, network 10 routes the SETUP message to network interface 180, since that is the network interface associated with terminal 162. Network interface 180 passes the SETUP message to CPE 170, which establishes data connection (over a preexisting physical connection) with terminal 162. CPE 170 originates a Q.933 CONNECT message, which is returned via network interface 180, network 10, and network interface 140 to CPE 130. A "call" is then in session between the two terminals.

FIG. 4 depicts another scenario known to those skilled in the art and relevant to the present invention, in which terminal 162 at the REMOTE location requests communication with terminal 112 at the LOCAL location. Message flow is the reverse of that shown in FIG. 3, but likewise results in a call being is session between the two terminals.

In communication system, calls are sometimes interrupted because of equipment failure, interruption of the transmission paths comprising network 10, tampering (whether inadvertent or deliberate), and so forth. Means are known is the art for re-establishing dropped connections. For example, many types of communication channels monitor the primary link of a call and, upon detecting that the primary link has gone down, can perform a switchover to a backup link. Such communication channels can further detect when the primary link recovers, and can switch back to the primary link, taking the backup link down again. However, is the process of making these switchovers, existing call sessions are dropped and must be reinitiated by the end user.

Thus, there is a need for a communication system that can reconfigure itself to restore a connection without dropping existing call sessions. There is a further need for a communication system that can reconfigure itself to restore a connection without losing a significant portion of a call.

Then and other objects of the invention will become apparent to those skilled in the art from the description which follows.

SUMMARY OF THE INVENTION

In one embodiment, the present invention provides for a method of reestablishing virtual circuits after the interruption thereof. Specifically, in a communication system comprising a network with a plurality of interconnectable interface ports; a plurality of customer premises equipment (CPE), each selectively connectable to at least one of said interlace ports; a plurality of terminals connected to each of said CPEs and being selectively operable as a source terminal to issue a setup request through its associated CPE for requesting connection to a terminal connected to a different CPE and operable as a destination terminal; wherein each of the interface ports an responsive to a setup request from a source terminal to connect itself via the network to a second interface port and to direct the second interface port to connect to a CPE associated with a requested destination terminal thus forming a virtual circuit between the source terminal and the requested destination terminal; and wherein each CPE is able to determine whether a virtual circuit is interrupted, the invention provides for the following steps to reestablish the virtual circuit after interruption thereof; (i) upon formation of a virtual circuit between a source terminal and a destination terminal, providing information descriptive of the virtual circuit to the source CPE; (ii) storing that virtual circuit information in the source CPE; (iii) upon determining that the virtual circuit is interrupted, establishing a connection between the source CPE and a third interface port; (iv) sending a setup request from the source CPE to the third interface port, which setup request includes the stored virtual circuit information; and (v) establishing a connection in response to the stored virtual circuit information via the network between the third interface port and the second interface port, thereby reestablishing the virtual circuit between the source terminal and the destination terminal.

In a preferred embodiment, when the virtual circuit is interrupted, the second interface port places the virtual circuit in a wait-for-backup mode. Upon expiration of a predetermined time, preferably a time longer than the time anticipated to reestablish the virtual circuit, if the virtual circuit is still in wait-for-backup mode, the second interface port drops the virtual circuit. Likewise, if the virtual circuit is reestablished, the second interface port removes the virtual circuit from the wait for backup mode.

In another embodiment, the invention provides a method for establishing a "tunnel" virtual circuit and storing information about the tunnel virtual circuit at the CPE associated with the source terminal, and that establishing "encapsulated" virtual circuits within the tunnel virtual circuit, also storing information about the encapsulated virtual circuits at the CPE associated with the source terminal. After failure of the tunnel virtual circuit or an encapsulated virtual circuit, the present invention provides for reestablishing the tunnel virtual circuit and all its encapsulated virtual circuits.

BRIEF DESCRIPTION OF THE DRAWINGS

The invention will be more clearly understood by reference to the following detailed description of exemplary embodiments of the invention in conjunction with the accompanying drawings, in which.

DESCRIPTION OF THE INVENTION

EXAMPLE I

Figure 1:
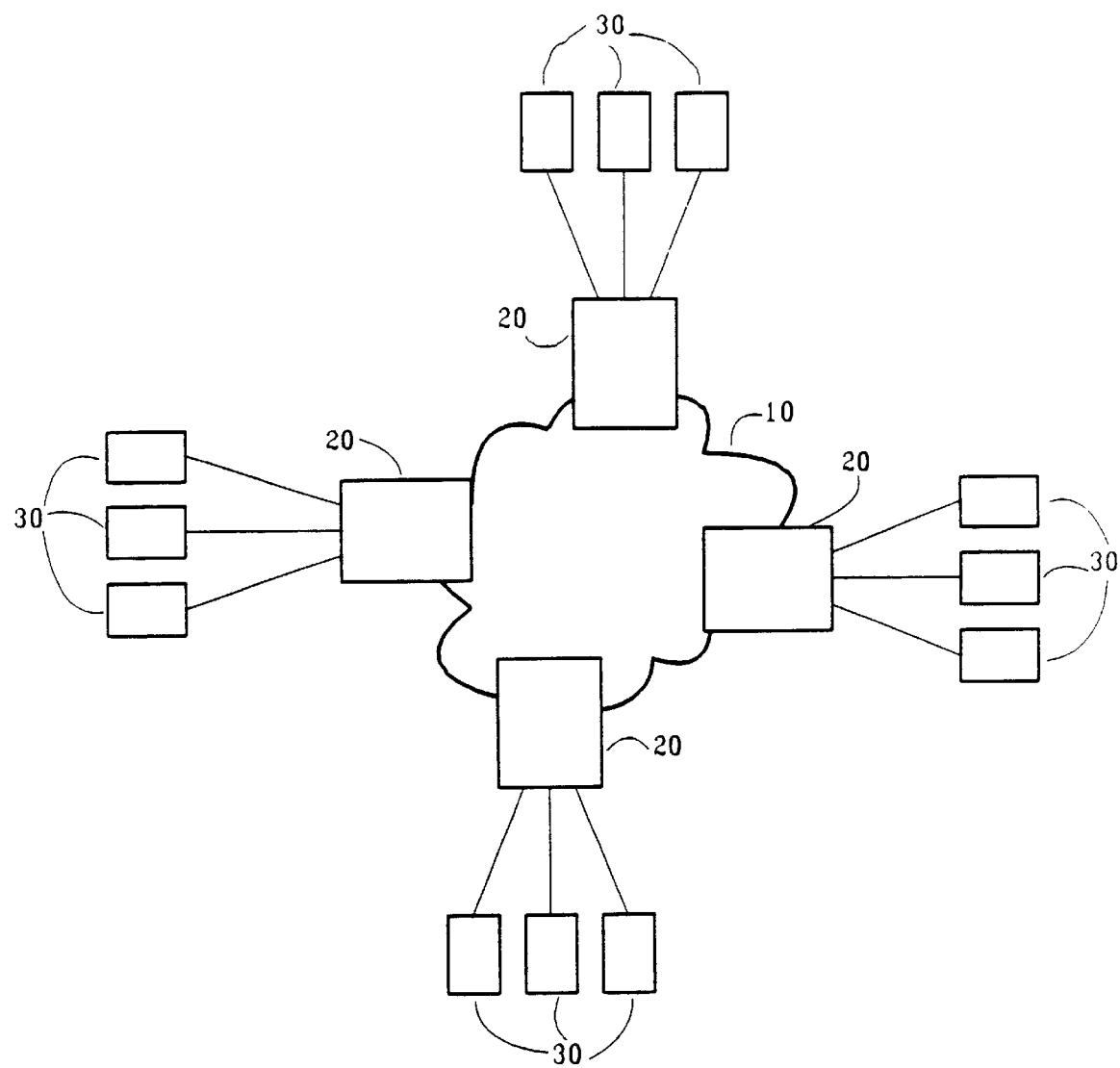
FIG. 1 (Prior Art) depicts a typical communication network.
Figure 2:
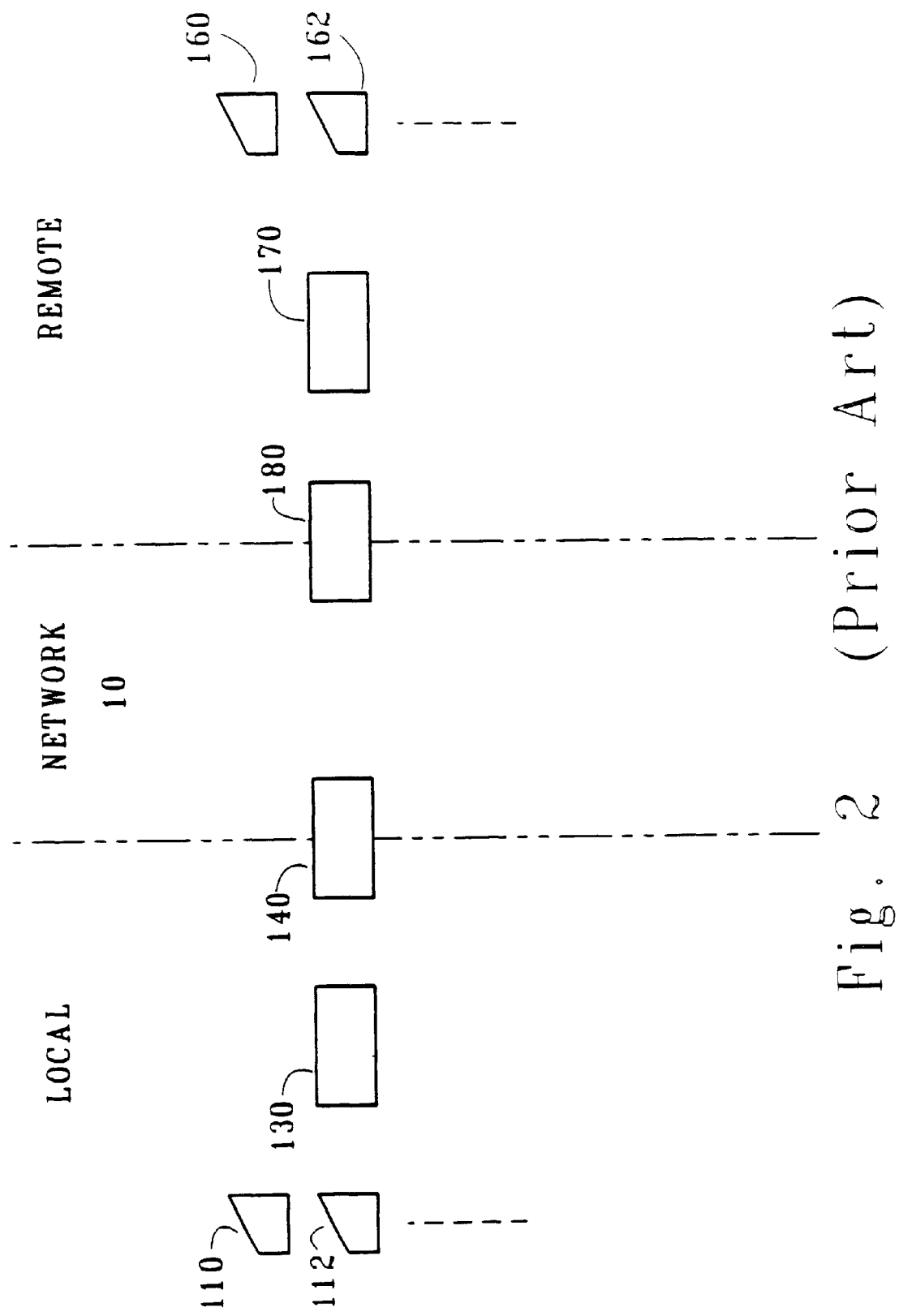
FIG. 2 (Prior Art) depicts aspects of a communication network with which the present invention may be used.
Figure 3:
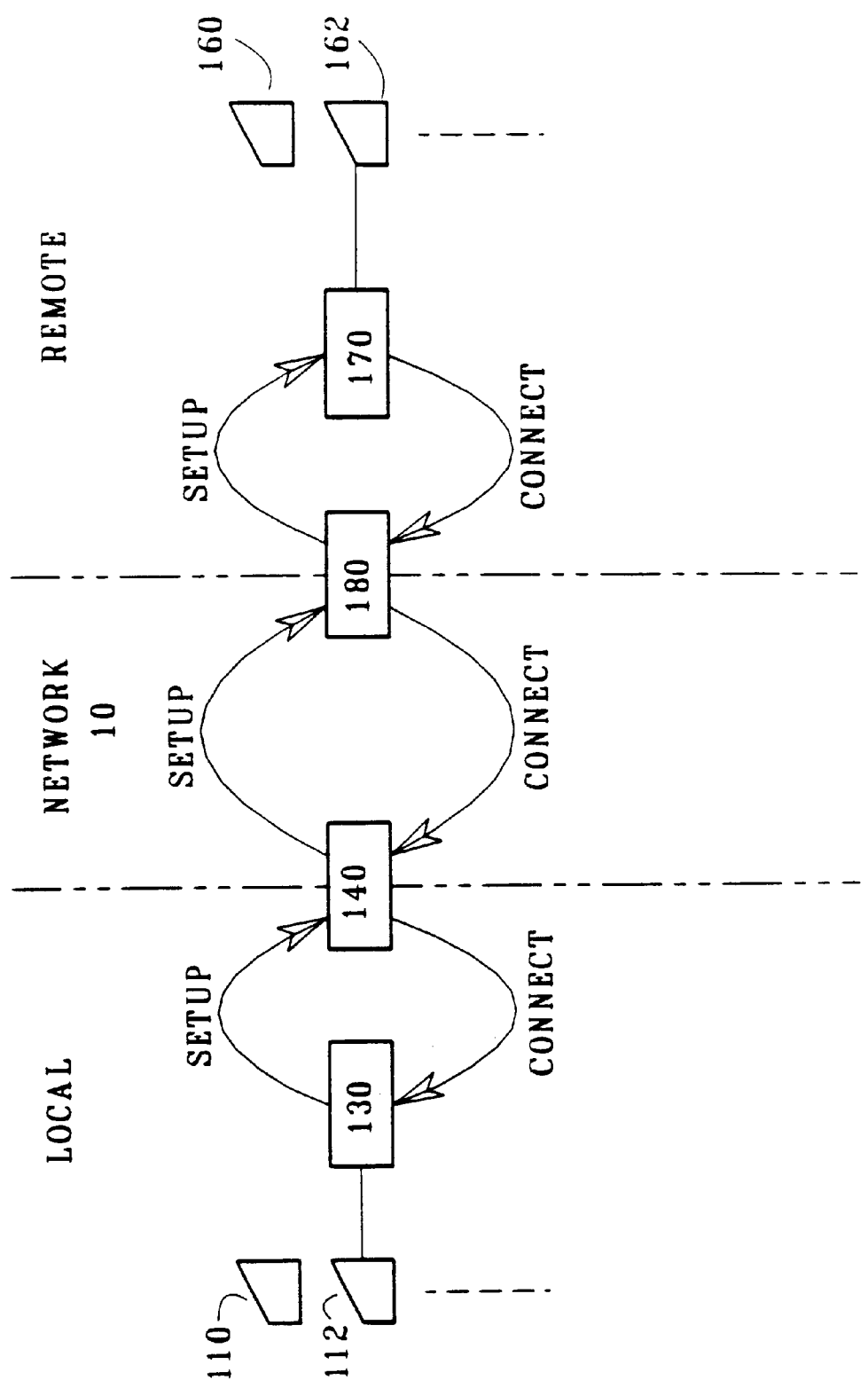
FIG. 3 (Prior Art) depicts setting up a LOCAL-to-REMOTE call on the network shown is FIG. 2.
Figure 4:
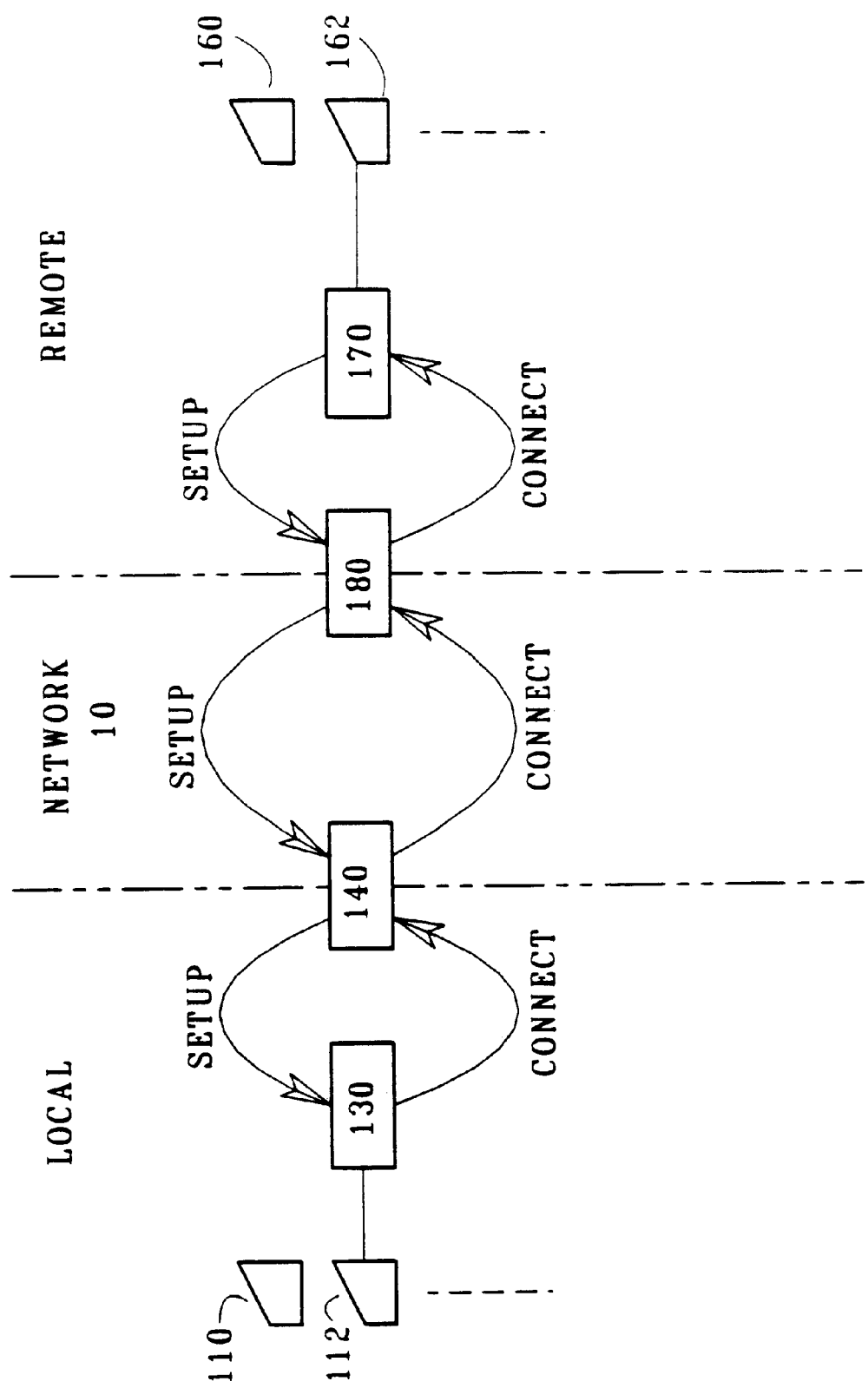
FIG. 4 (Prior Art) depicts setting up a REMOTE-to-LOCAL call on the network shown in FIG. 2.
Figure 5:
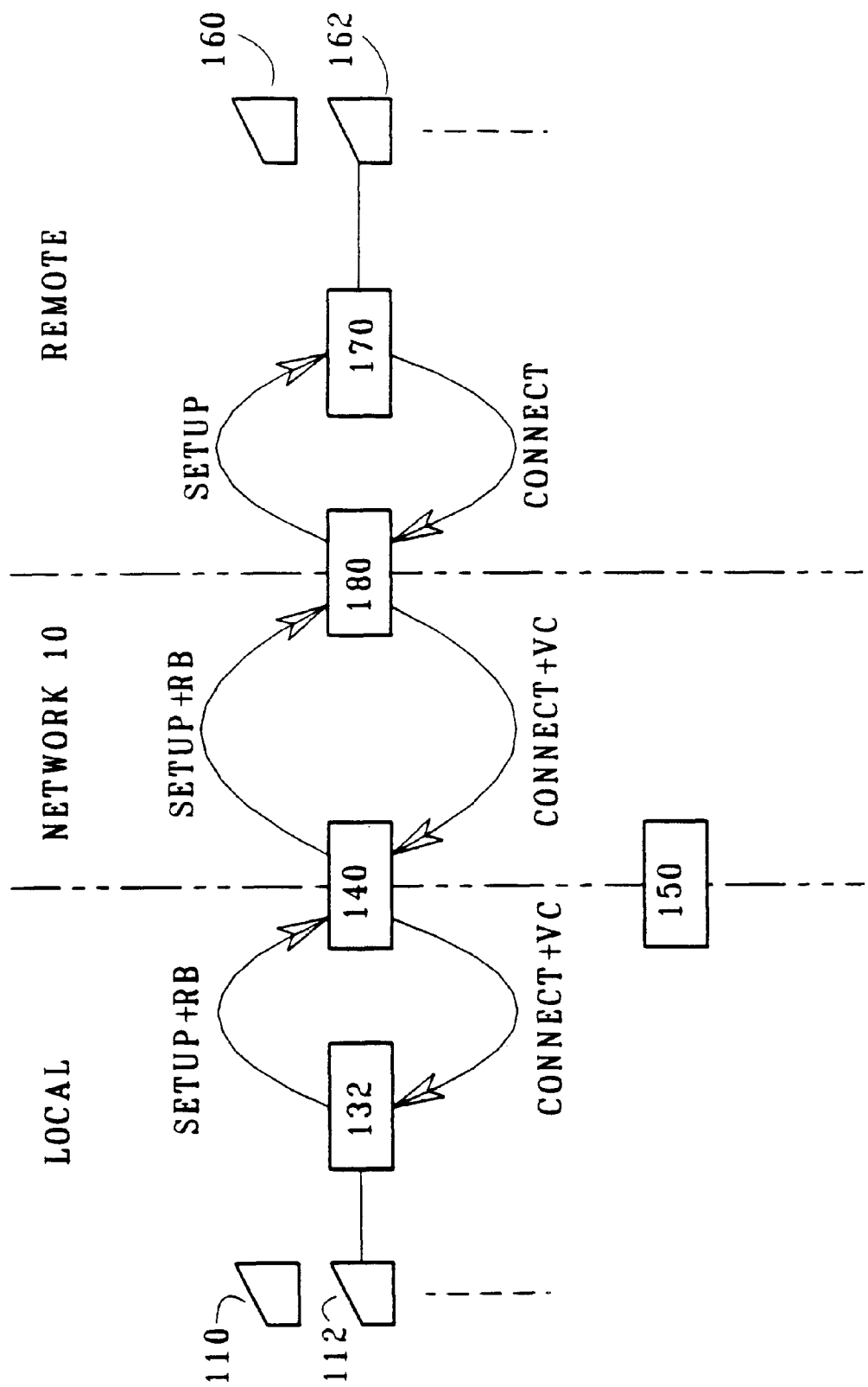
FIG. 5 depicts setting up a LOCAL-to-REMOTE call on a network embodying the present invention.

FIG. 5 depicts a network 10 with a LOCAL site which embodies the present invention. At the LOCAL site, a network interface 140 and a backup network interface 150 are provided. A CPE 132 is also provided at the LOCAL site. CPE 132 augments CPE 130 of the prior art in that CPE 131 has the ability to store and use virtual circuit description information as discussed below. It should be noted that, in this example, the REMOTE site is not provided with a backup network interface or an augmented CPE.

In this example, still referring to FIG. 5, LOCAL terminal 112 requests to communicate with REMOTE terminal 162. LOCAL terminal 112's request to communicate is passed to CPE 132 along with a request for backup of the virtual circuit that is to be established. CPE 133 forwards as network interface 140 a standard SETUP message (a conventional setup message such a Q933, Q.2931 or other signalling protocol, which will be referred to as Q.933 in this application) except that the mange has a request for backup (RB). The RB can be added to the SETUP message by CPE 132 or by LOCAL terminal 112. Network interface 140 forwards the SETUP+RB message across network 10 to network interface 180, which forwards a Q.933 SETUP message to CPE 170 which invokes communication with terminal 162 thus completing the virtual circuit. CPE 170 also returns a standard CONNECT message (a conventional connect message such as Q.933, Q.2931, or other signalling protocol which will be referred to as Q.933 is this application) to network interface 180. CPE 180 passes a Q.933 CONNECT message with a virtual circuit (VC) message appended across network 10 to network interface 140. The CONNECT+VC message is then passed back to CPE 132, which stores the VC information.

If network interface 140 or the link through network 10 falls, interrupting the virtual circuit, the following will take place. Network interface 180 continues to hold the call for a time longer then the expended reestablishment time, such as for sixty seconds. At the expiration of that time, network interface 180 drops the call.

Figure 6:
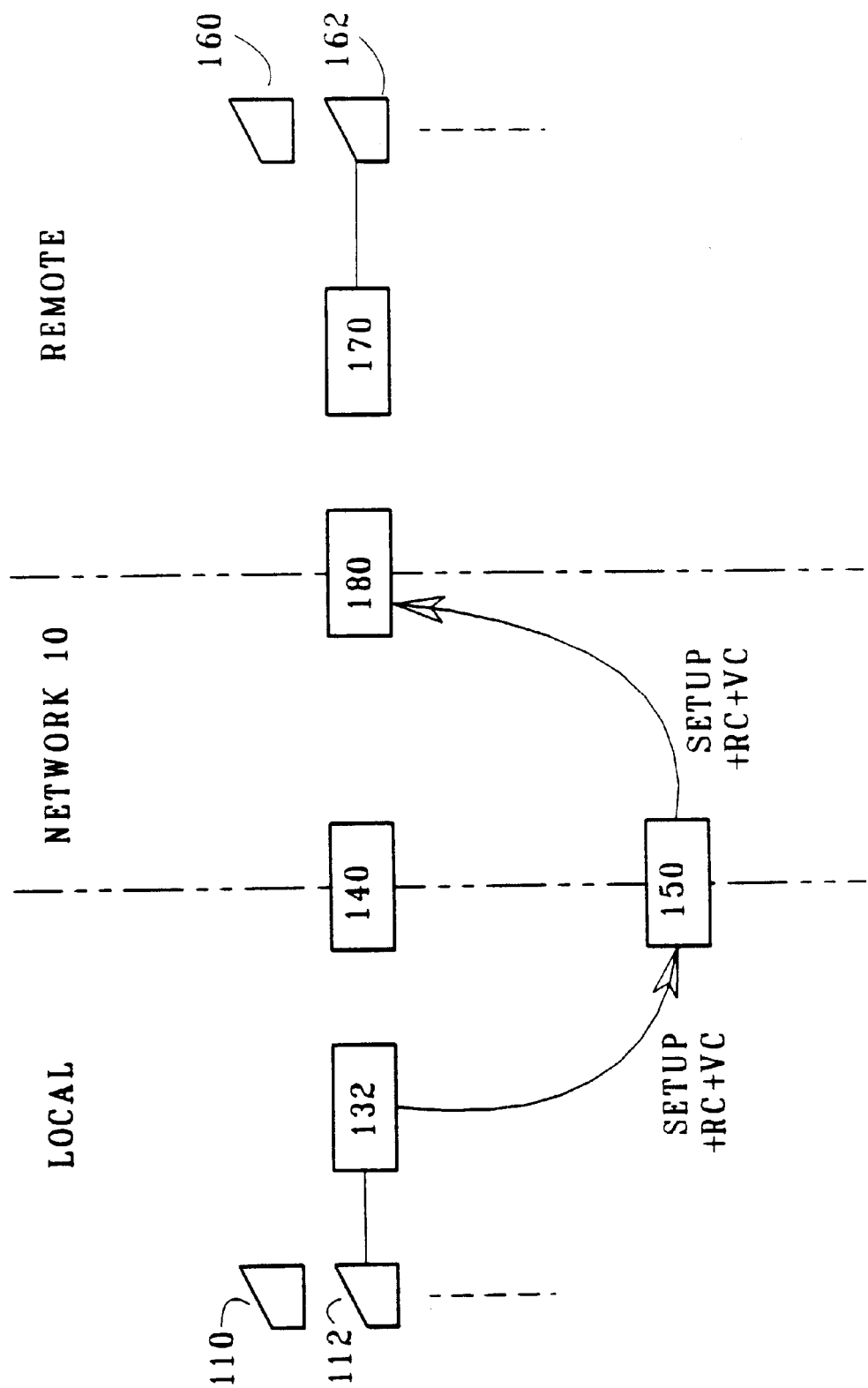
FIG. 6 depicts restoration of the virtual circuit after interruption is provided by the present invention.

CPE 132, upon detecting interruption of the virtual circuit, requests reestablishment of the virtual circuit. Referring now to FIG. 6, if network interface 140 is the cause of the interruption, CPS 132 will now work with backup network interface 150. CPE 132 forwards to network interface 150 a Q.933 SETUP message, appended to which are a RC (reconnect request) and the aforementioned VC (virtual circuit) description, which was stored by CPE 132 upon initial establishment of the virtual circuit. This compound message is forwarded across the network 10 to network interface 180. Since CPE 170 has been holding the call, the virtual circuit can be reestablished on the new links from network interface 150 through network 10 to network interface 180, in accordance with the description contained in the VC description appended to the message. Because the SETUP message is accompanied by the RC and VC messages, the nodes (e.g. the CPEs, terminals, etc.) would not attempt to set up a new virtual circuit. It is only in response to a SETUP message which is not accompanied by other messages wherein the nodes would attempt to establish a new virtual circuit.

EXAMPLE II

Figure 7:
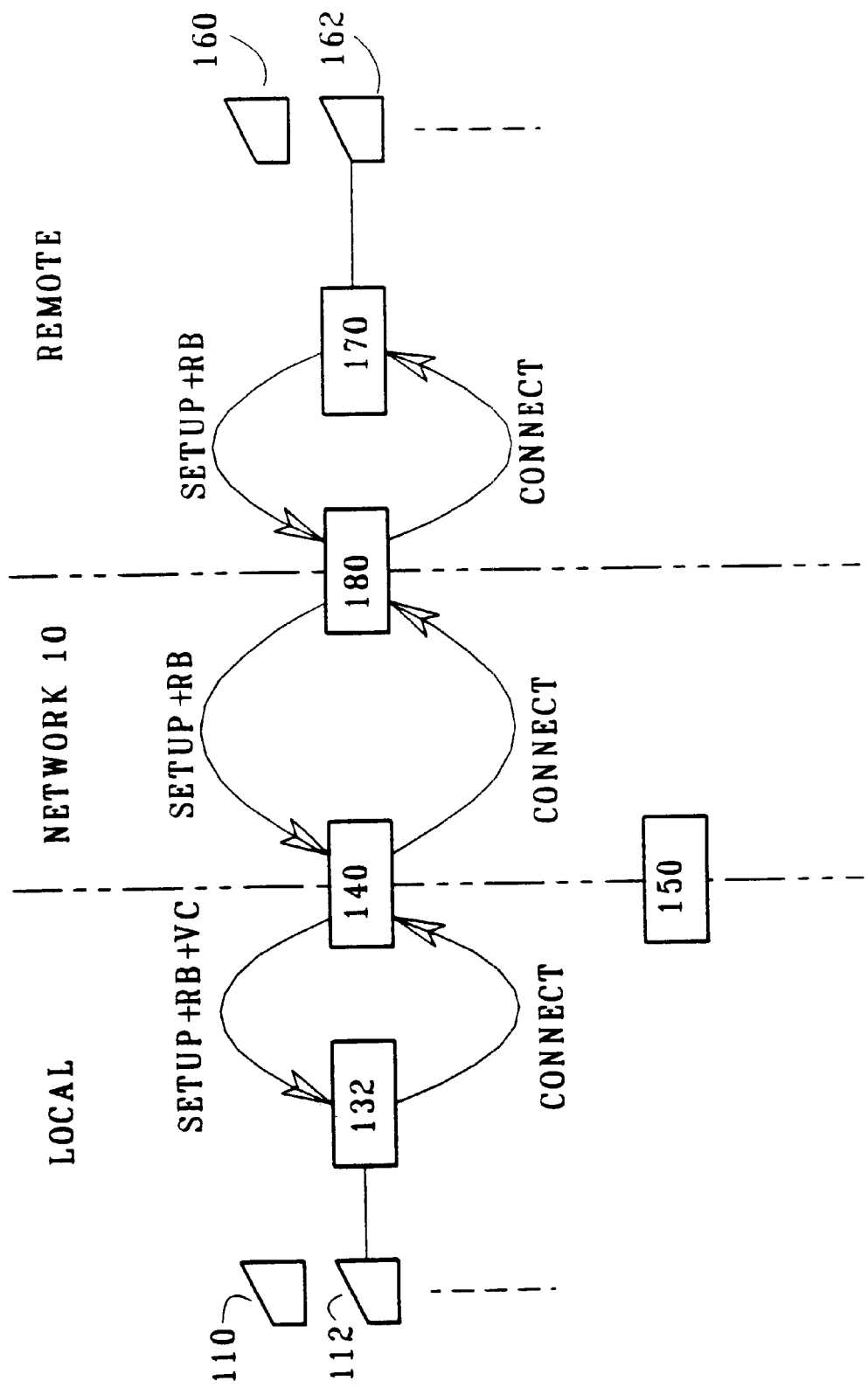
FIG. 7 depicts setting up a REMOTE-to-LOCAL call on a network embodying the present invention.

Referring to FIG. 7, it is now assumed by way of example that REMOTE terminal 162 requests communication with LOCAL terminal 112. In this example, the REMOTE location is not equipped with a backup network interface. CPE 170 forwards to network interface 180 the Q.933 SETUP message (Q.933 referring again to conventional signalling protocols such as Q.933 and Q.2931), with a RB (Request Backup) message appended to it. The RB message could be added by REMOTE terminal 162, CPE 170 or network interface 180. The SETUP+RB message is forwarded across network 10 to network interface 140. Network interface 140 adds the VC description message and forwards SETUP+RB+VC to CPE 132, which stores the VC message and initiates data communication with terminal 112.

As in Example I, when the network interface 140 or the link through network 10 tails, the virtual circuit is interrupted. Network interface 180 continues to hold the call for a specified time, such as for up to sixty seconds, in anticipation of reestablishing the virtual circuit. REMOTE CPE 170 will drop the call if reestablishment has not occurred within the specified time period.

The actions depicted in FIG. 6, which were performed in response to the interruption assumed in Example I, are performed again in the present example. That is, CPE 132 detects the interruption and requests reestablishment of the virtual circuit. CPE 132 again forwards to network interface 150 a Q.933 SETUP message, appended to which are a RC (reconnect request) and the aforementioned VC description, which was stored by CPE 132 upon initial establishment of the virtual circuit. This compound message is forwarded across the network 10 to network interface 180. Since CPE 170 has been holding the call, the virtual circuit can be reestablished over new communication links through network 10 from network interface 150 to network interface 180, according to the description contained in the VC description portion of the message.

EXAMPLE III

Figure 8:
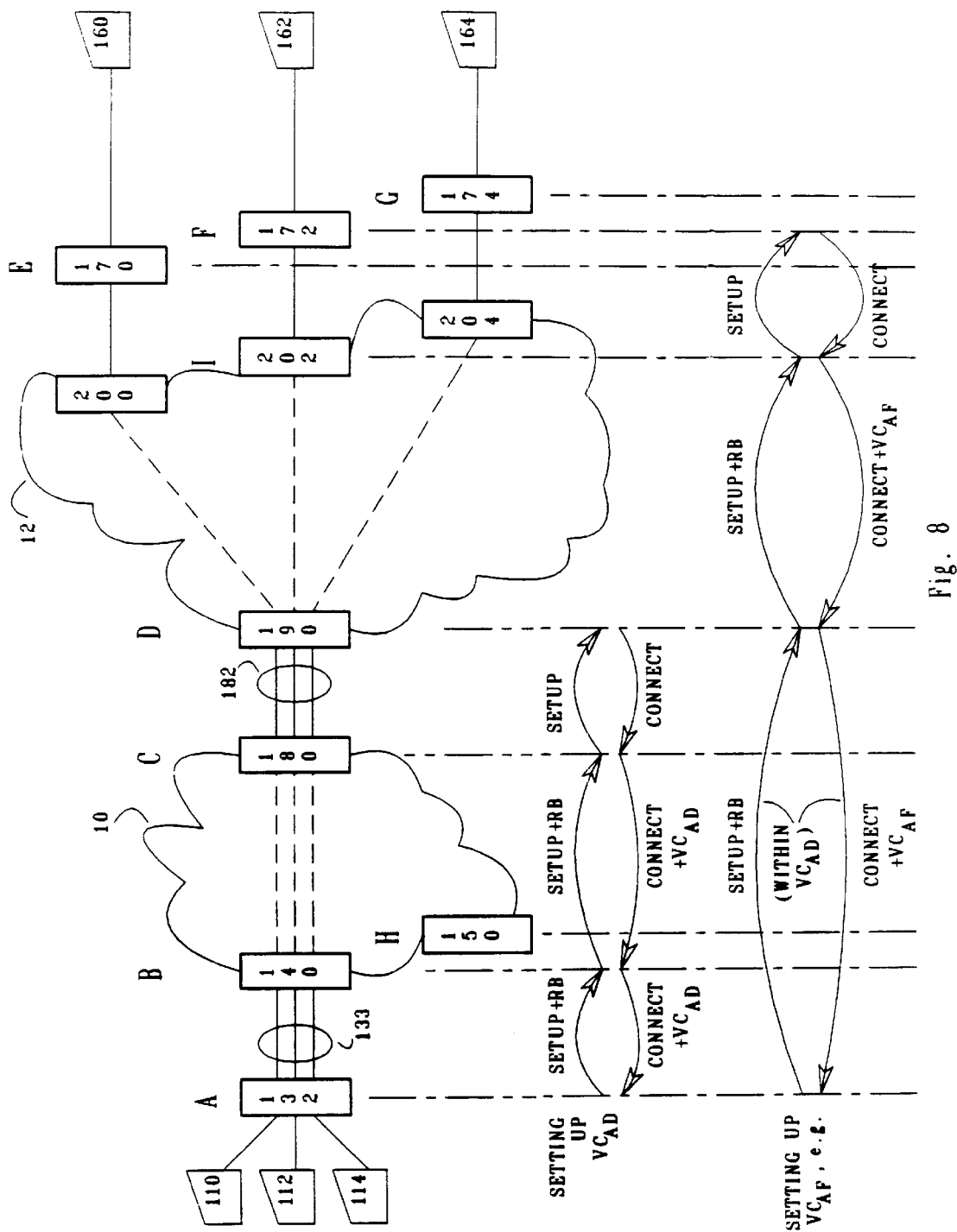
FIG. 8 depicts setting up a "tunnel" virtual circuit which can encapsulate other virtual circuits, and setting up a typical encapsulated virtual circuit.

FIG. 8 depicts a network 10 in which the present invention may be used to recover "tunnel" virtual circuits which, in turn, may "encapsulate" a plurality of individual virtual circuits. FIG. 8 includes a LOCAL site with terminals 110, 112, 120, 122, etc. connected to CPE 132. CPE 132 augments CPE 130 of the prior art in that CPE 132 has the capability to store and use virtual circuit description information. CPE 132 connects to network interface 140 for interfacing with network 10. CPE 132 can also connect to network interface 150, which is also present at the LOCAL site. Network interface 180 is present at a remote point on network 10.

FIG. 8 also depicts a second network 12, which may be any public network. As depicted, there are connections from network 10 via network interface 180 to network 12 via network interface 190. CPEs 170, 172, 174 etc. are connected at a remote point of network 12, through network interfaces 200, 202, 204, etc. as required by network 12. Each of CPE's 170, 172, 174, etc. may have one or more terminals connected to it, such as 160, 162, 164, etc. Moreover, CPEs 170, 172, 174, etc. and their respective terminals are not necessarily collocated. CPE 132 is identified as point A, network interface 140 as point B, network interface 180 as point C, etc. and so on. As is known in the art, a tunnel virtual circuit may be established from CPE 132 (point A) to network interface 190 (point D), and is designated $VC_{AD}$. Specifically CPE 132 may forward a Q.933 SETUP message (Q.933 referring again to conventional signalling protocols such as Q.933 and Q.2931), specifying that a plurality of lines be included in the virtual circuit, to network interface 140, with a request for backup (RB) message appended. Network interface 140 causes allocation of the plurality of lines within network 10, and forwards the SETUP+RB message to network interface 180, which acts upon it and in turn forwards a Q.933 SETUP message to network interface 190. This establishes a conceptual "tunnel" from point A to point D, denoted as elements 133 and 182 respectively on the two sides of network 10. These elements 133 and 182 each contain a plurality of individual virtual circuits.

A Q.933 CONNECT message is returned from network interface 190 to network interface 180. Then, network interface 180 appends a $VC_{AD}$ message describing the virtual circuit AD. A CONNECT+$VC_{AD}$ message is then forwarded to network interface 140, and thence to CPE 132 where it is stored for possible future use.

Individual virtual circuits may now be established through the tunnel. These individual virtual circuits are known as "encapsulated" virtual circuits.

As an example, local terminal 112 wishes to communicate with remote terminal 162. This requires setting up a virtual circuit from CPE 132 (designated point A of the network) to CPE 172 (designated point F of the network). The virtual circuit to be established will therefore be called $VC_{AF}$. It should be noted that communicating with remote terminals 160 or 164, which would require establishing virtual circuits $VC_{AE}$ or $VC_A$, respectively, is similar to the description below.

A Q.933 SETUP message with a request for backup (RB) message attached, is sent from CPE 132 to network interface 190. This is accomplished via the virtual circuit $VC_{AD}$. Network interface 190 then forwards a SETUP+RB message to network interface 202, which forwards a Q.933 SETUP message to CPE 172. CPE 172 returns a Q.933 CONNECT message to network interface 202, which appends a $VC_{AF}$ message (descriptive of virtual circuit AF) and forwards CONNECT+$VC_{AF}$ message to network interface 190 which, in turn, forwards the message to CPE 132 (again, via virtual circuit AD ($VC_{AD}$)). The description is stored by CPE 132.

If network interface 140 or the links through network 10 fail, the tunnel $VC_{AD}$ is interrupted along with any virtual circuits encapsulated therein, such as $VC_{AF}$ in the above example.

Figure 9:
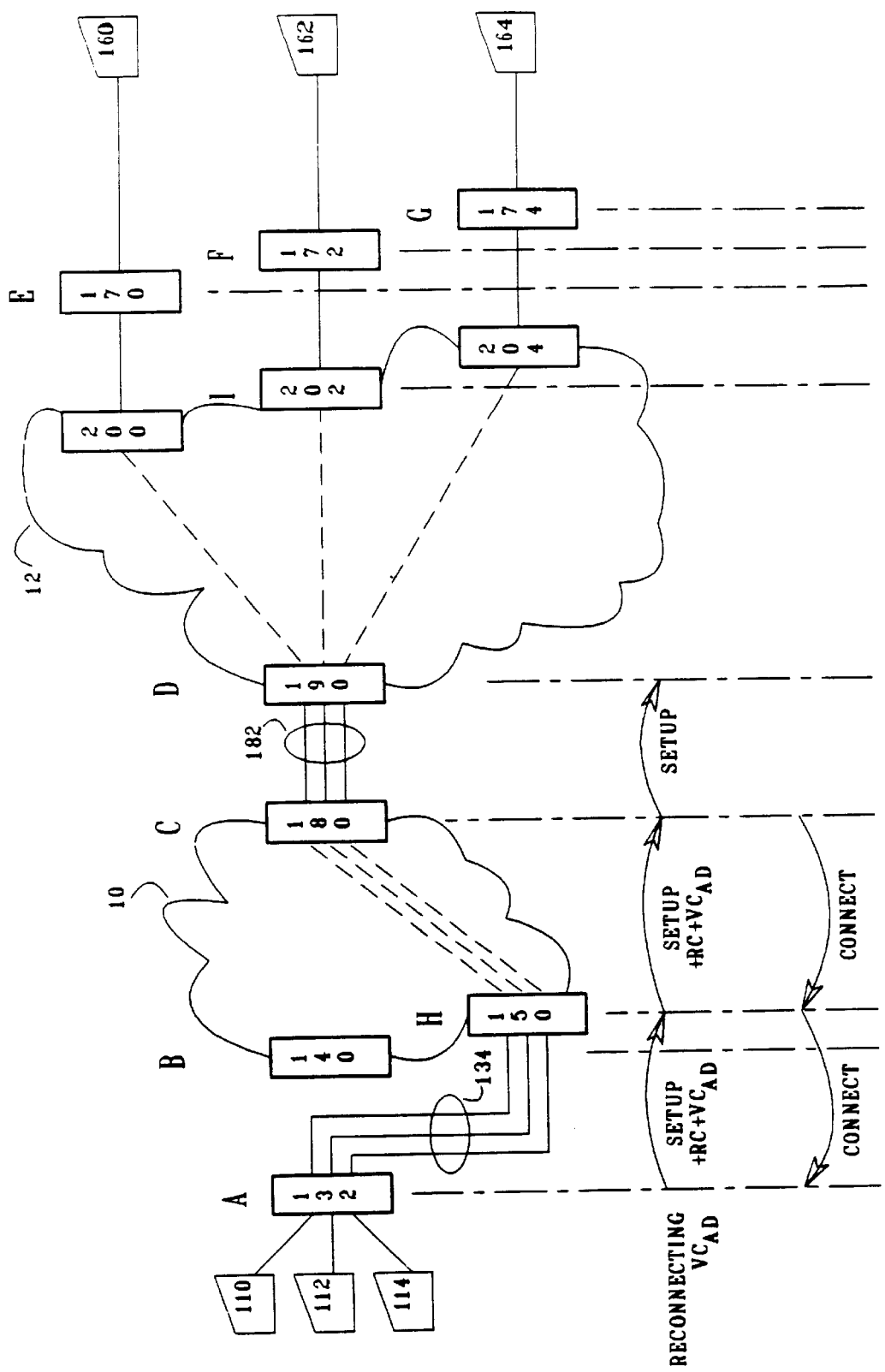
FIG. 9 depicts restoration of the tunnel virtual circuit after interruption as provided by the present invention.

As discussed in connection with Example I, the remote CPEs (such as 172 in the present example) continue to hold their calls for a predetermined time, such as up to 60 seconds. CPE 132 detects interruption and requests reestablishment of the virtual circuits. FIG. 9 depicts an example wherein network interface 140 is the cause of the interruption. CPE 132 will now communicate with backup network interface 150, forwarding a Q.933 SETUP message, appended to which are a RC (reconnect request) and the aforementioned $VC_{AD}$ description, which was stored by CPE 132 upon initial establishment of $VC_{AD}$. This compound message is forwarded across the network 10 to network interface 180, which forwards a Q.933 SETUP message to network interface 190. $VC_{AD}$ is now reestablished through tunnels 133 and 182 on either side of network 10, and provides communication links as assigned by network 10 between network interface 150 and network interface 180.

Since CPE 172 has been holding the call on virtual circuit $VC_{AF}$, and since that virtual circuit is encapsulated within $VC_{AD}$ which is now reestablished, the call over $VC_{AF}$ may proceed. That is, as described above, messages are sent over the communication link from network interface 190 to network interface 202 and then to CPE 172. Calls on $VC_{AE}$ and $VC_{AG}$ proceed similarly.

It can thus be seen that the invention provides virtual circuit reconnection without loss of a call session. Those skilled in the art will appreciate that the configurations depicted in FIGS. 5 and 7 establish virtual circuits in a manner amenable to reconnection as depicted in FIG. 6, while the configuration depicted in FIG. 8 establishes virtual circuits encapsulated within a tunnel virtual circuit in a manner amenable to reconnection as depicted in FIG. 9.

It is to be understood by those skilled in the art that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed is:

1. In a communication system comprising:
   a network with a plurality of interconnectable interface ports;
   a plurality of customer premises equipment (CPE), each selectively connectable to at least one of said interface ports;
   a plurality of terminals connected to each of said CPEs;
   each terminal being selectively operable as a source terminal to issue a setup request through its associated CPE for requesting connection to a terminal connected to a different CPE and operable as a destination terminal;
   each of said interface ports being responsive to a setup request from a source terminal to connect itself via said network to a second interface port and to direct said second interface port to connect to a CPE associated with a requested destination terminal thus forming a virtual circuit between said source terminal and said requested destination terminal; and
   wherein each CPE is able to determine whether a virtual circuit is interrupted, a method of reestablishing said virtual circuit after interruption thereof, comprising the following steps:
   upon formation of said virtual circuit between said source terminal and said destination terminal, providing to said CPE associated with said source terminal information describing said virtual circuit;
   storing said virtual circuit information in said CPE associated with said source terminal;
   upon determining that said virtual circuit is interrupted, establishing a connection between said CPE associated with said source terminal and a third interface port;
   sending a setup request from said CPE associated with said source terminal to said third interface port, said setup request including said stored virtual circuit information; and
   establishing a connection responsive to said stored virtual circuit information via said network between said third interface port and said second interface port,
   thereby reestablishing said virtual circuit between said source terminal and said destination terminal.

2. The method recited in claim 1 wherein, upon determining that a virtual circuit is interrupted, said second interface port places said virtual circuit in a wait-for-backup mode.

3. The method recited in claim 2 wherein, upon expiration of a predetermined time, if said virtual circuit is still in wait-for-backup mode, said second interface port drops said virtual circuit.

4. The method recited in claim 3 wherein said predetermined time is substantially longer than a time anticipated for reestablishment of said virtual circuit.

5. The method recited in claim 2 wherein, upon reestablishing said virtual circuit, said second interface port removes said virtual circuit from said wait-for-backup mode.

6. In a communication system comprising:
   a network with a plurality of interconnectable interface ports;
   a plurality of customer premises equipment (CPE), each selectively connectable to at least one of said interface ports;
   a plurality of terminals connected to each of said CPEs;
   each terminal being selectively operable as a source terminal to issue a setup request through its associated CPE for requesting connection to an interface port which is not connected to said network;
   each of said interface ports being responsive to a setup request from a source terminal to connect itself via said network to a second interface port and to direct said second interface port to connect to a third interface port which is not connected to said network thus forming a virtual circuit between said source terminal and said third interface port; and
   wherein each CPE is able to determine whether a virtual circuit is interrupted,
   a method of reestablishing said virtual circuit after interruption thereof, comprising the following steps:
   upon formation of said virtual circuit between said source terminal and said third interface port, providing to said CPE associated with said source terminal information describing said virtual circuit;
   storing said virtual circuit information in said CPE associated with said source terminal;
   upon determining that said virtual circuit is interrupted, establishing a connection between said CPE associated with said source terminal and a fourth interface port;
   sending a setup request from said CPE associated with said source terminal to said fourth interface port, said setup request including said stored virtual circuit information; and
   establishing a connection responsive to said stored virtual circuit information via said network between said fourth interface port and said second interface port,
   thereby reestablishing said virtual circuit between said source terminal and said third interface port.

7. In a communication system comprising:
   a plurality of networks, each of said networks having a plurality of interchangeable interface ports;
   a plurality of customer premises equipment (CPE), each selectively connectable to at least one of said interface ports;
   a plurality of terminals connected to each of said CPEs;
   each terminal being selectively operable as a source terminal to issue a setup request through its associated CPE for requesting connection to a second interface port and to a terminal connected to a different CPE and operable as a destination terminal;
   each of said interface ports being responsive to a setup request from a source terminal to connect itself via a first network to a second interface port and to direct said second interface port to connect to at least a third interface port associated with at least a second network thus forming a virtual circuit between said source terminal and said third interface port;
   said third interface port, and any other interface port said second interface port is directed to connect to, being responsive to a setup request from a source terminal to connect itself via said second network, and any other network associated with any other interface port, to at least a fourth interface port and to direct said fourth interface port to connect to a CPE associated with a requested destination terminal, thus forming at least a first encapsulated virtual circuit between said source terminal and said requested destination terminal; and wherein each CPE is able to determine whether a virtual circuit and whether an encapsulated virtual circuit is interrupted;

a method of reestablishing said encapsulated virtual circuit after interruption thereof, comprising the following steps:

upon formation of said virtual circuit between said source terminal and said third interface port, providing to said CPE associated with said source terminal information describing said virtual circuit;

upon formation of an encapsulated virtual circuit between a source terminal and a destination terminal, providing to said CPE associated with said source terminal information describing said encapsulated virtual circuit;

storing said virtual circuit information and said encapsulated virtual circuit information in said CPE associated with said source terminal;

upon determining that said virtual circuit or said encapsulated virtual circuit is interrupted, establishing a connection between said CPE associated with said source terminal and a fifth interface port;

sending a setup request from said CPE associated with said source terminal to said fifth interface port, said setup request including said encapsulated virtual circuit information; and establishing a connection responsive to said stored encapsulated virtual circuit information between said fifth interface port and said fourth interface port via said first network between said fifth interface port and said second interface port, and then between said second interface port and said third interface port and then via said second network, and any other interface port, between said third interface port, and any other interface port said second interface port is directed to connect to and said fourth interface port, thereby reestablishing said encapsulated virtual circuit between said source terminal and said destination terminal.

8. The method recited in claim 7 wherein, upon determining that said virtual circuit or said encapsulated virtual circuit is interrupted, said fourth interface port places said encapsulated virtual circuit in a wait-for-backup mode.

9. The method recited in claim 8 wherein, upon expiration of a predetermined time, if said encapsulated virtual circuit is still in wait-for-backup mode, said fourth interface port drops said encapsulated virtual circuit.

10. The method recited in claim 9 wherein said predetermined time is substantially longer than a time anticipated for reestablishment of said encapsulated virtual circuit.

11. The method recited in claim 8 wherein, upon reestablishing said virtual circuit, said fourth interface port removes said encapsulated virtual circuit from said wait-for-backup mode.

12. A method of reestablishing a virtual circuit while a call session is being held, comprising:

sending a request to communicate over a virtual circuit together with a request for backup of the virtual circuit;

storing information that describes the virtual circuit;

creating a call session over the virtual circuit via links and, in response to an interruption of the virtual circuit, holding the call session for a period of time longer than an expected time to effect re-establishment of the virtual circuit;

detecting the interruption of the virtual circuit;

forwarding a setup message and reconnect request that contains the stored information in response to the interruption being detected during the detecting; and in response to completion by the forwarding, carrying out the reconnect request via different links based on the stored information to reestablish the virtual circuit before expiration of the period of time.

13. A method as in claim 12, further comprising placing the virtual circuit in a wait-for-backup mode in response to the detecting of the interruption.

14. A method as in claim 13, further comprising removing the virtual circuit from the wait-for-backup mode provided the virtual circuit is subsequently reestablished upon successful completion of the carrying out of the reconnect request within the time period.

15. A method as in claim 13, further comprising dropping the virtual circuit after expiration of the time period provided the virtual circuit still remains in the wait-for-backup mode.

16. A method as in claim 12, wherein the virtual circuit is encapsulated by a tunnel virtual circuit.

17. A method as in claim 12, wherein the virtual circuit encapsulates at least one further virtual circuit.

18. An apparatus to reestablish a virtual circuit while a call session is being held, comprising:

means for sending a request to communicate over a virtual circuit together with a request for backup of the virtual circuit;

means for storing information that describes the virtual circuit;

means for creating a call session over the virtual circuit via links and, in response to an interruption of the virtual circuit, for holding the call session for a period of time longer than an expected time to effect re-establishment of the virtual circuit;

means for detecting the interruption of the virtual circuit;

means for forwarding a setup message and reconnect request that contains the stored information in response to the interruption being detected by the means for detecting; and means responsive to completion by the forwarding means for carrying out the reconnect request via different links based on the stored information to reestablish the virtual circuit before expiration of the period of time.

19. An apparatus as in claim 18, further comprising means for placing the virtual circuit in a wait-for-backup mode in response to means for the detecting the interruption.

20. An apparatus as in claim 19, further comprising means for removing the virtual circuit from the wait-for-backup mode provided the virtual circuit is subsequently reestablished upon successful completion by the means for carrying out of the reconnect request within the time period.

21. An apparatus as in claim 19, further comprising means for dropping the virtual circuit after expiration of the time period provided the virtual circuit still remains in the wait-for-backup mode.

22. An apparatus as in claim 18, wherein the virtual circuit is encapsulated by a tunnel virtual circuit.

23. An apparatus as in claim 18, wherein the virtual circuit encapsulates at least one further virtual circuit.

24. An apparatus to reestablish a virtual circuit while a call session is being held, comprising:
- a sender over a virtual circuit of a request to communicate and a request for backup of the virtual circuit;
- storage configured to store information that describes the virtual circuit;
- circuitry configured to create a call session over the virtual circuit via links and, in response to an interruption of the virtual circuit, to hold the call session for a period of time longer than an expected time to effect re-establishment of the virtual circuit;
- a detector of an interruption of the virtual circuit;
- a forwarder of a setup message and a reconnect request that contains the stored information in response to the interruption being detected by the detector; and
- circuitry configured to carry out, in response to completion by the forwarder, the reconnect request via different links based on the stored information to reestablish the virtual circuit before expiration of the period of time.

25. An apparatus as in claim 24, further comprising control circuitry configured to place the virtual circuit in a wait-for-backup mode in response to the detector detecting the interruption.

26. An apparatus as in claim 25, wherein the control circuitry is configured to remove the virtual circuit from the wait-for-backup mode provided the virtual circuit is subsequently reestablished upon successful completion by the circuitry configured to carry out the reconnect request within the time period.

27. An apparatus as in claim 25, wherein the control circuitry is configured to drop the virtual circuit after expiration of the time period provided the virtual circuit still remains in the wait-for-backup mode.

28. An apparatus as in claim 24, wherein the virtual circuit is encapsulated by a tunnel virtual circuit.

29. An apparatus as in claim 24, wherein the virtual circuit encapsulates at least one further virtual circuit.

* * * * *